(12) United States Patent
Vanstone et al.

(10) Patent No.: US 6,377,689 B1
(45) Date of Patent: Apr. 23, 2002

(54) KEY TRANSMISSION SYSTEM

(75) Inventors: Scott C. Vanstone; Robert J. Zuccherato, both of Waterloo (CA)

(73) Assignee: Certigom Corp., Mississauga (CA)

( * ) Notice: Subject to any disclaimer, the term of this patent is extended or adjusted under 35 U.S.C. 154(b) by 0 days.

(21) Appl. No.: 09/612,685

(22) Filed: Jul. 10, 2000

Related U.S. Application Data

(62) Division of application No. 08/449,357, filed on May 24, 1995, now Pat. No. 6,134,325.

(30) Foreign Application Priority Data

May 24, 1994 (GB) .............................................. 9410337

(51) Int. Cl.$^7$ .................................................. H04K 1/00
(52) U.S. Cl. ........................ 380/259; 380/262; 380/30; 713/181
(58) Field of Search ................................ 380/259, 260, 380/262, 30; 713/181

(56) References Cited

U.S. PATENT DOCUMENTS

| | | | |
|---|---|---|---|
| 4,200,770 A | 4/1980 | Hellman et al. | 380/30 |
| 4,405,829 A | 9/1983 | Rivest et al. | 380/30 |
| 4,969,190 A | * 11/1990 | Takaragi et al. | 380/43 |
| 6,078,663 A | * 6/2000 | Yamamoto | 380/9 |
| 6,081,598 A | * 6/2000 | Dai | 380/28 |

OTHER PUBLICATIONS

"Applied Cryptography", Bruce Schneier(pp. 564–574), Oct. 1995.*

"Applied Cryptography", Alfred J. Menezes, et al. (pp. 285–291 and pp. 312–315), Jan. 1997.*

* cited by examiner

Primary Examiner—Albert Decady
Assistant Examiner—Todd Jack
(74) Attorney, Agent, or Firm—The Maxham Firm

(57) ABSTRACT

A RSA encryption scheme includes a modulus in which at least one set of bits is of a predetermined configuration. The configuration may be selected to replicate the identity of the recipient or other information normally transmitted between the parties or may be information stored by the sender to allow only the balance of the modulus to be transmitted with the sender subsequently reconstructing the modulus.

7 Claims, 1 Drawing Sheet

KEY TRANSMISSION SYSTEM

This application is a divisional of application Ser. No. 08/449,357 filed on May 24, 1995 now U.S. Pat. No. 6,134,325.

FIELD OF THE INVENTION

The present invention relates to public key cryptography.

BACKGROUND OF THE INVENTION

It is well known that data can be encrypted by utilising a pair of keys, one of which is public and one of which is private. The keys are mathematically related such that data encrypted by the public key may only be decrypted by the private key. In this way, the public key of a recipient may be made available so that data intended for that recipient may be encrypted with the public key and only decrypted by the recipients private key.

The most well known and accepted public key cryptosystems are those based on discrete logarithms in finite groups and integer factorization. In particular, the Diffie-Hellman key exchange and the El Gamal protocol in $Z_p^*$, p a prime and the RSA system for modulus n=p·q where p and q are primes have been implemented worldwide. One disadvantage of these systems is that p and n must be relatively large (at least 512 bits) to attain an adequate level of security.

To implement the public key schemes it is necessary to transfer the public key of a recipient to the sender or for the sender to store the keys of all possible recipients. For this reason researchers have looked for public key schemes which reduce the size of the public key. An attractive and promising system is the Diffie-Hellman and El Gamal protocols defined in the group associated with the points on an elliptic curve over a finite field. It appears that a 155-bit elliptic curve scheme gives comparable security to a 1024-bit RSA modulus. Nevertheless, RSA remains a very viable and practical encryption and signing process.

The implementation of RSA system requires a modulus n to be generated from two primes, p,q. The primes p,q, are also used to select a pair of integers, d,e, that are related such that the product e.d≡1 (mod(p−1)(q−1)) and that the GCD (greatest common denominator) of e, p−1 and q−1=1.

The integers e together with the modulus n is used as the public key and the integer d with the modulus n is used as the private key. To encrypt a message the sender uses the public key e,n of the recipient and exponentiates the message M to the integer 'e' mod n to generate ciphertext C. The recipient receives the ciphertext C and uses the private key d,n to retrieve the message M by exponentiating C to power d mod n. Therefore the communication between the sender and recipient requires the sender to have access to the public key of the recipient. Typically the public key will be retrieved from the recipient at the start of transmission or it may be stored by the sender. The public key must also be associated with other information such as the recipients identity and be transmitted in a conventional frame format. Accordingly, it is desirable for the data that has to be transmitted to be as short as possible.

On the other hand, the security of the RSA system is determined by the difficulty in factoring the modulus n and this requires p and q to be as large as possible, typically at least 256 bits but preferably 512. n itself will therefore also be large, either 512 or 1024 bits.

It is an object of the present invention to provide a method for reducing the storage and transmission requirement of RSA public moduli without compromising security.

SUMMARY OF THE INVENTION

The present invention is based upon the recognition that if the modulus n is an m-bit number it is possible to specify t bits of the number where t is suitably bounded whilst retaining the requisite security. If the t bits can be random bits the criteria for retaining security is somewhat simplified. In one embodiment, a group of users may use the same t random bits and hence only m−t bits need be stored for each user and one copy of the t random bits for the entire group. In another embodiment a user may specify the t bits to be a binary representation of their user ID and other publicly available information. This situation can also be implemented by adjoining a small number of random bits after the information. The applicants have recognised that one can always specify up to m/2 of the bits, but specifying m/2 of the bits comes at the expense of longer key generation (i.e. prime generation). Varied embodiments may be implemented depending on the degrees of dependence between the primes p and q.

According to the present invention, an RSA moduli is generated in which a predetermined set of bits within the moduli have a predetermined configuration.

BRIEF DESCRIPTION OF THE DRAWINGS

An embodiment of the invention will now be described by way of example only with reference to the accompanying drawings in which:

FIG. 2 are schematic representations of a framed word to transmit data with

DESCRIPTION OF THE PREFERRED EMBODIMENTS

Figure 1:
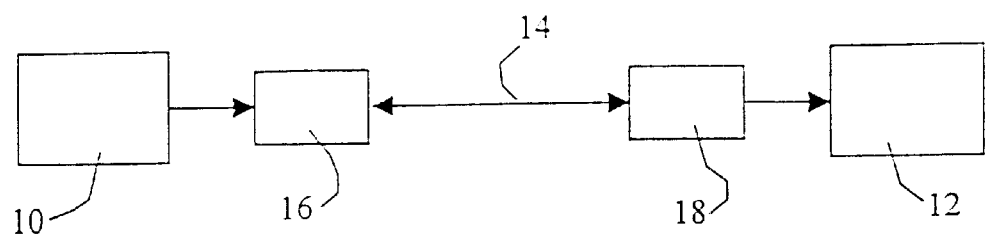
FIG. 1 is a representation of data transmission system.

Referring therefore to FIG. 1, a sender 10 transmits data to a recipient 12 through a telecommunications line 14. Data from the sender 10 is encrypted in an encryption module 16 before transmission over the line 14 and is decrypted by a decryption module 18.

Communication between the sender 10 and the recipient 12 is undertaken according to an established protocol which will usually require the transmission of data identifying the sender and the intended recipient. The data will be transmitted in a predefined frame format including a header with the identification frames and the data.

Where the data encryption is performed according to an RSA protocol, the recipient 12 will be associated with a pair of keys, one of which is public and the other of which is private. To transmit data from the sender 10 to the recipient 12, the recipients public key is retrieved by the sender. This requires the transmission of a multi-bit key, typically 512 bits but more desirably 1024 bits. This has to be transmitted in a frame format suitable for the protocol.

In one embodiment, to avoid excessive overhead, the public key is transmitted to include a set of bits having a predetermined configuration that corresponds to information normally transmitted as part of the transmission protocol. In this way the data transfer may be reduced for each encryption stage.

Alternatively, the public key may be arranged with a predetermined configuration for a set of bits and those bits may then be stored at the sender requiring only the transmission of the balance of the bits. Again a reduction in the data transfer is achieved.

A number of alternative methods are available for providing the predetermined configuration of data as will be described below.

Figure 2A:
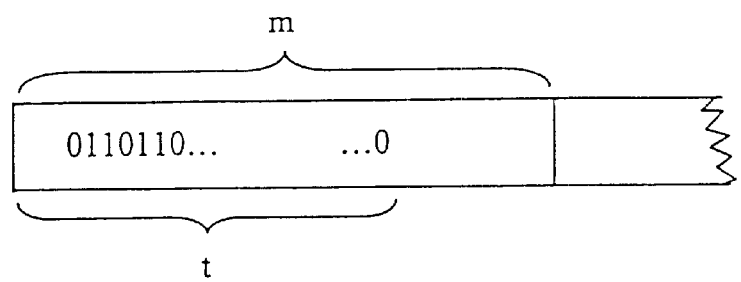
FIG. 2a showing an embodiment in which the information may be incorporated into the key transmission.

In order to encrypt data, it is necessary for the sender 10 to have access to the recipients public key. In the first embodiment of the present invention as shown in FIG. 2A, the public key is transmitted in its entirety between the intended recipient and the sender and a predetermined configuration of bits is provided within the data structure to comply with the frame structure determined by the protocol. Thus, as shown in FIG. 2A, the initial t bits of the m bit public key of a recipient is configured to correspond to the personal identification number of the recipient 12. Accordingly, it is only necessary to transmit a frame containing the m bits of the public key rather than the m+t bits that would otherwise be necessary if the users identification had to be included separately within the frame.

Figure 2B:
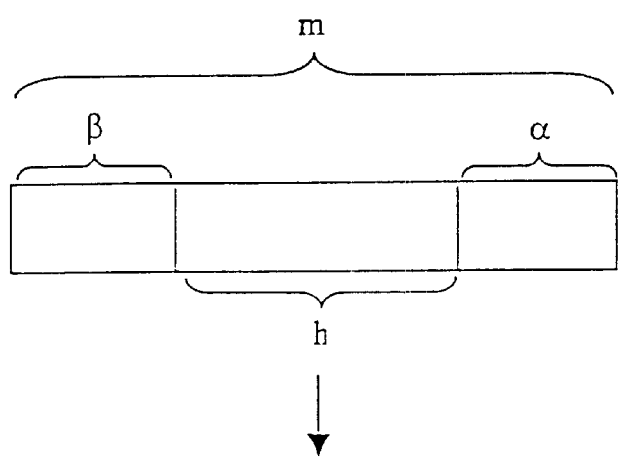
FIG. 2b shows an embodiment in which a reduced number of bits may be transmitted.

In a second embodiment as shown in FIG. 2B, the frame transmitted includes the normal recipients identification followed by h bits of the public key. The public key is arranged to have a predetermined configuration having a initial multi-bit number $\beta$ and a terminal multi-bit number $\alpha$. The values of $\alpha$ and $\beta$ are stored by the sender and upon receipt of the intermediate h bits the key n can be reconstructed. In this way the number of bits transmitted to establish a key may be reduced.

Different methods of determining the predetermined configuration may be used depending upon the implementation desired.

EXAMPLE 1

As a first example, it is assumed that a scheme is to be implemented as shown in FIG. 2A in which the first t bits of the public key have a predetermined configuration so that they may represent additional information such as the identity of the recipient. This requires that the first t bits of the modulus n may be specified. The modulus n is equal to the product of two prime numbers p·q and this method will be described for the case where n is a 1024 bit number.

In this scheme p and q are effectively chosen independently.

Let $\beta$ be a fixed number of length t=2·k bits, and assume that $\beta$ factors as $\beta = f_1 \cdot f_2$ where $f_1$ and $f_2$ are each of length k-bits. The primes p and q will then be of the form $p = 2^{512-k} \cdot f_1 + a_1$ and $q = 2^{512-k} \cdot f_2 + a_2$, where $a_1$ and $a_2$ are numbers of length l-bits. To get n p and q are multiplied so that $$p \cdot q = 2^{1024-2 \cdot k} \cdot f_1 \cdot f_2 + 2^{512-k}(f_1 \cdot a_2 + f_2 \cdot a_1) + a_1 \cdot a_2.$$

It is easy to see that if the last two terms in the sum are less than 1024−2·k bits, then the first 2·k bits are exactly the number $\beta$. Accordingly, by choosing $\beta$ to represent the additional information then the first bits of the modulus will convey that information. To guarantee this it is necessary to ensure that 512−k+k+l+2<1024−2·k or l+2·k<510.

To guarantee security it is necessary to ensure that, given n, $f_1$, and $f_2$, it is difficult to determine p and q, or equivalently, $a_1$ and $a_2$. It is thus necessary to require $a_1 \cdot a_2$ to be at least (512−k)-bits.

A brute force attack on $a_1$ and $a_2$ would involve trying every possible combination of $a_1$ and $a_2$ until the corresponding values of p and q multiplied to give n. Thus in order to prevent this type of attack the overlap between $a_1 \cdot a_2$ and the $2^{512-k}(f_1 \cdot a_2 + f_2 \cdot a_1)$ term is preferred to be at least 60 bits. This determines that 2·l>512−k+60 or 2·l+k>572.

The above two inequalities force a largest possible value for k of 148 and thus t=296. This gives a corresponding value of 213 for l. Therefore the first 296 bits of a 1024 bit modulus n can be specified to be of a predetermined configuration without compromising the security of the system.

The ability to specify the first t bits of the modulus can be used in two ways. Firstly, the users or recipients identification may be encoded in the 296 bits identified as $\beta$, allowing ready identification or routing. Alternatively, the first 296 bits may be stored within each member or group to reduce transmission time and those bits subsequently added to determine the modulus.

i) Generation of Primes p·q

In the above example the primes should be of the form $p = 2^{512-k} \cdot f + a$ where f has a length of k bits and a is an l-bit number. To produce such a prime, a random l-bit number a is chosen and $p = 2^{512-k} \cdot f + a$ tested for primality using the Miller-Rabin primality test. If p is not prime, other suitable a's are selected until a prime is found. To avoid a brute force attack on n l is chosen large enough to guarantee suitable interaction between the terms $a_1 \cdot a_2$ and $2^{512-k}(f_1 \cdot a_2 + f_2 \cdot a_1)$ of the product p·q.

ii) Generation

More generally, if n is required to be a size other than 1024 bits, say m bits, then it is easy to verify (in the manner of above) that the following two inequalities must hold. If p and q are m/2 bits long, then l+2·k<m/2−2 and 2·l+k>m2+ $\epsilon(n)$ where $\epsilon(n)$ is the number of bits of overlap required to make brute force search less effective than other general purpose factoring algorithms. (i.e. we should choose $\epsilon(n)$ so that $2^{\epsilon(n)} \approx 0(e^{\sqrt{ln(n)ln(ln(n))}})$). The largest possible value of t can then be taken as the maximum number of bits that can be specified. In this way, the predetermined configuration or the key length may be optimised.

EXAMPLE 2

In the above example of the first t bits of the modulus was of a predetermined configuration. It is also possible to specify that the last t bits is of a predetermined configuration and in this way it is possible to specify up to half of the bits of n but now q is completely dependent on the choice of p.

By way of example, for m=1024, i.e. the number of bits is 1024, $\alpha$ and $\beta$ are predetermined configurations of 256-bit numbers that are public knowledge and may each represent additional information such as the identification of the recipient or an address of the recipient. $\beta$ is such that it factors as $\beta = f_1 \cdot f_2$ for 128-bit numbers $f_1$ and $f_2$. Primes p and q are created such that $p = 2^{384} \cdot f_1 + a_1$ and $q = 2^{384} \cdot f_2 + a_2$. $a_1$ and $a_2$ are 248-bit numbers chosen such that $a_1 \cdot a_2 \equiv \alpha (\mod 2^{256})$. Then this gives $$n = 2^{768} \cdot f_1 \cdot f_2 + 2^{384}(f_1 \cdot a_2 + f_2 \cdot a_1) + a_1 \cdot a_2.$$

It is easily seen that $2^{384}(f_1 \cdot a_2 + f_2 \cdot a_1) + a_1 \cdot a_2$ is at most 763 bits so there is no carry into $2^{768} \cdot f_1 \cdot f_2$, and the high order 256 bits of n are the number $\beta$. Also since $a_1 \cdot a_2 \equiv \alpha (\mod 2^{256})$, the low order 256 bits are the number $\alpha$. The middle 512 bits of n can then be communicated, stored and the full number can be retrieved.

Accordingly, rather than communicate a 1024 bit key it is simply necessary to store the values of $\alpha$, $\beta$ and receive n/2, i.e. 512 bits.

It will of course be appreciated that information may only be incorporated in one of the predetermined configurations α or β as required or that α and β could be combined to provide different parts of the same information.

To guarantee security it is necessary to ensure that given α, n, $f_1$, and $f_2$ finding $a_1$ and $a_2$ is a difficult problem. Since, $a_1 \cdot a_2$ is a 496-bit number of which 384 bits are known from the form of n, this leaves 112 bits of flexibility, or $2^{112}$ possibilities for $a_1 \cdot a_2$. Exhaustive search techniques would therefore be infeasible by current technology.

i) Generation of Primes p,q

To produce the primes p and q of the desired form, 248-bit odd numbers, $a_1$ should be randomly chosen until a p is found that is prime. The Extended Euclidean Algorithm is then used to produce an $a_2$ such that $a_1 \cdot a_2 \equiv \alpha \pmod{2^{256}}$. If $a_2$ is less than $2^{248}$ and q is prime then the algorithm terminates, if not then an alternative random values for $a_1$ must be chosen. There is a problem with this algorithm; namely obtaining a value for $a_2$ that is less than $2^{248}$.

To deal with this problem the parameters may be changed in the following way. The numbers $f_1$ and $f_2$ will still be 128-bit numbers, but now $p=2^{376} \cdot f_1 + a_1$ and $q=2^{392} \cdot f_2 + a_2$ where $a_1$ is a 240-bit number and $a_2$ is 256 bits. Then we get $$n = 2^{768} \cdot f_1 \cdot f_2 + 2^{392} \cdot f_2 \cdot a_1 + 2^{376} \cdot a_2 + a_1 \cdot a_2.$$

Now $2^{392} \cdot f_2 \cdot a_1 + 2^{376} \cdot f_1 \cdot a_2 + a_1 \cdot a_2$ is at most 763 bits so there is no carry over into $2^{768} \cdot f_1 \cdot f_2$ and $a_1 \cdot a_2$ is a 496 bit number with only 376 bits left unhidden so there are $2^{120}$ possibilities for this value. This actually gives an improvement of the level of security obtained before. The algorithm can now be changed to choose $a_1$ to be 240 bits and not to require $a_2$ to be less than $2^{248}$. The primes p and q are now 504 and 520 bits respectively.

ii) Generation

The above example has used a modulus m of 1024 bits but in many applications the size of n may be required to be larger or smaller than 1024 bits. This may be provided with modified parameters that handle the more general situation. Assume that n is to be 8·k bits long, where k>8. Then p and q should each be approximately 4·k bits in length. α and β be specified numbers as before, of length 2·k and β factors as $f_1 \cdot f_2$, where $f_1$ and $f_2$ are k-bit numbers. It is then required that $a_1$ is a (2·k−8)-bit number and $a_2$ as 2·k bits, so that $p=2^{k_1} \cdot f_1 + a_1$ and $q=2^{k_2} \cdot f_2 + a_2$, where $k_2=3 \cdot k-4$ and $k_1=3 \cdot k+4$. Choose $a_1$ and $a_2$ as before i.e. $a_1 \cdot a_2 \equiv \alpha \pmod{k}$.

This gives $$n = 2^{k_1+k_2} \cdot f_1 \cdot f_2 + 2^{k_2} \cdot f_2 \cdot a_1 + 2^{k_1} \cdot f_1 \cdot a_2 + a_1 \cdot a_2,$$

with β being the first 2·k bits and α being the last 2·k bits. There is an overlap of k−4 bits between the $a_1$ and $a_2$ term and the $2^{k_1} \cdot f_1 \cdot a_2$ term so that this product still remains hidden and hence exhaustive search techniques remain infeasible for large k.

There are certain advantages and disadvantages to both of the schemes described thus far. Where the primes p and q are chosen independently, a good running time results but at the expense of only being able to specify about one quarter of the bits. Alternatively, where half the bits could be specified, the primes are completely dependent on each other resulting in a very poor running time. It is possible, as described below, to utilize a compromise scheme which will have some of the advantages of both techniques.

EXAMPLE 3

In the above example, both α and β were k bit numbers. It is however possible that the lengths of α and β are different.

Taking as an example a 1024 bit number, let β be a 256-bit number such that it factors as $\beta = f_1 \cdot f_2$ for 128-bit numbers $f_1$ and $f_2$. Let α be a u-bit number where u<248. The required primes will be of the form $p=2^{384} \cdot f_1 + a_1$ and $q=2^{384} \cdot f_2 + a_2$ where $a_1$ and $a_2$ are 248-bit numbers. The final u bits of n are to be exactly the number α so $a_1 \cdot a_2 \equiv \alpha \pmod{2^u}$. Thus, as before, $$n = 2^{768} \cdot f_1 \cdot f_2 + 2^{384}(f_1 \cdot a_2 + f_2 \cdot a_1) + a_1 \cdot a_2.$$

Again, it is easy to see that the top 256 bits of n are the number β and the bottom u bits are α.

As was shown in the example above, there is an overlap of 112 bits between the last two terms of n. Therefore, obtaining the values $a_1$ and $a_2$, and thus obtaining the primes is a different problem.

i) Generation of primes p·a

The desired primes can be produced in the following way. As before, randomly choose 248-bit numbers $a_1$ and test $p=2^{384} \cdot f_1 + a_1$ for primality. If p is prime, then by using the Extended Euclidean Algorithm a u-bit number c can be produced such that $a_1 \cdot c \equiv \alpha \pmod{2^u}$. Random (248−u)-bit numbers b can then be chosen to produce $a_2 = b \cdot 2^u + c$ until the corresponding value of q is prime. As a result, now $a_1 \cdot a_2 \equiv \alpha \pmod{2^u}$.

When searching for q, we will be searching a particular residue class modulo $2^u$. The distribution of primes in this class is about the same as for any interval of about the same size. It is therefore necessary to choose the parameter u such that there are enough possibilities for b to guarantee with high probability the existence of a prime of this particular form. In this interval one would expect there to be approximately $2^{(248-u)}/\ln(2^{512})$ primes. It then follows that u should be chosen to be somewhere between 228 and 218 to give between about 20 and 30 bits of freedom to find a suitable b.

If a key of arbitrary size is required, the analysis done above also applies here. The size of a must now be u bits, and this size should be chosen so that a prime is likely to be found for any value of c.

Selection of the Predetermined Configuration β

In the above examples, a value of β is chosen to provide certain characteristics. However, further consideration should be given to the selection of β for optimum results. As describe above, β is a number of length 2·k bits which factors as $f_1 \cdot f_2$ for k bit numbers $f_1$ and $f_2$. This is the case when the first t=2·k bits of n are being specified and when half the bits are being specified. Since there are no conditions on α, this value can be chosen to be any convenient number of the appropriate size.

On the other hand, β must be chosen so that it factors appropriately. If these t bits can be random bits there is no problem. Simply choose two numbers $f_1$ and $f_2$ of length k bits and multiply them together to get a (2·k)-bit number β. In this situation, a number of people can all use the same β (and α if needed) thus reducing the amount of memory needed to store all of their public keys or reduce the transmission required.

In some situations however, the user may want these t bits to be a binary representation of their user ID and other publicly available information. This situation is slightly more complicated because this number may or may not factor as the product of two numbers of equal size. This problem can be overcome by leaving some random bits at the low end of β to allow more choice for the factors i.e. the information is contained in the first s bits of the predetermined configuration with the balance being selected to facilitate factoring.

Preferably β should factor into two numbers about the same size as its square root. To accomplish this, a difference of d bits can be allowed in the size of the factors $f_1$ and $f_2$. Thus, the parameters $k_1$ and $k_2$ will have to be similarly changed to give two primes p and q of equal size. This can be done easily with no change in security or prime generation. An estimation of r(u), the probability that a random integer, N, has no prime factor greater than $N^{1/u}$ can be obtained using $r(u) \approx e^{-u \cdot \ln u}$ which is a crude approximation to the value. If every prime factor of β has fewer than d bits then it will factor into two integers differing in size by d bits. This is not the only way to guarantee that β will factor correctly but it is sufficient, and will be used to get a vast upper bound on the number of random bits needed. If β is 256 bits, as may be the case when n is 1024 bits, then this probability is approximately $e^{-(256/d) \cdot \ln(256/d)}$. It is then easy to see that a difference of 10 bits between the factors of β will only require about 47 random bits to guarantee with high probability the existence of factors of the required type. Thus, the first 209 bits of β can be the publicly available information, while the final 47 bits can be varied until β factors as desired. Experimental results confirm that with 47 bits of randomness, β should factor as required with very little difficulty.

It may also be desired to allow $f_1$ and $f_2$ to be the publicly available information. Only one multiplication would then be required to obtain β and thus the public modulus. This does not compromise security as $f_1$ and $f_2$ are already public.

Prime Generation

The above techniques require the generation of primes p,q of a particular form. Maurer has previously described in the Journal of Cryptology 1991, how to generate provable primes in time only about ⅓ greater than the expected running time required for generating a pseudo-prime that passes the Miller-Rabin test for only one base. We will briefly sketch his method here.

The following two lemmas form the basis for the algorithm. Lemma 1 is a special case of a theorem due to Pocklington.

Lemma 1 Let n=2RF+1 where F has a known prime factorization $F = q_1^{\beta_1} \cdot q_2^{\beta_2} \cdot \ldots \cdot q_r^{\beta_r}$. If there is an integer a satisfying $$a^{n-1} \equiv 1 \pmod{n}$$

and $$\gcd(a^{(n-1)/q_j} - 1, n) = 1$$

for j=1, ..., r, then each prime factor p of n is of the form p=mF+1 for some integer m≧1. Moreover, if F>√n, or if F>R, then n is prime.

Lemma 2 Let p=2RF+1 be a prime with $$F = \prod_{j=1}^{r} q_j^{B_j},$$

F>R and gcd(2R, F)=1, where $q_1, \ldots, q_r$, are distinct primes. The the probability that a randomly selected base $a \in \mathbb{Z}_p^*$ is successful in proving the primality of p by Lemma 1 is equal to ψ(F)/F which is at least $$1 - \sum_{j=1}^{r} 1/q_j.$$

The primes are constructed recursively by first constructing small primes $q_1$ through $q_r$, and then picking random R until p=2RF+1 can be proved prime by an appropriate choice of the base a. Lemma 2 shows that if p is indeed prime then finding a base a that is successful in proving this fact is easy. Also, if p is composite and does not contain a small prime factor that will reveal itself in trial division then virtually every base a will satisfy $a^{p-1} \equiv 1 \pmod{p}$, and will be a witness for the compositeness of p, unless p is of a very special form.

By choosing $q_i$ of the appropriate size the prime p can be chosen to lie within a certain interval $[P_1, P_2]$ as set out more fully in the article to Maurer.

When only the first t=2·k bits of the product n are specified, the choice of p is independent of the choice of q(actually, the choice of $a_1$ is independent of the choice of $a_2$). To find a prime of the form $p = 2^{m/2-k} \cdot f + a$, where $f$ is k bits long and a is l bits, it is simply necessary to produce a prime p by the above method in the interval $[2^{m/2-k} \cdot f, 2^{m/2-k} \cdot f + 2^l]$. This prime is of the desired form.

In the other schemes the primes p and q are at least partially dependent on each other and hence the generation of these primes is more complex and time consuming. The first prime p can be produced as described above, but then q is at least partially determined. As mentioned above the Extended Euclidean Algorithm must be used to obtain the appropriate value for $a_2$ and thus get q. The primality of q can then be checked using the Miller-Rabin test. If q is not prime, either a new p must be chosen or a new b must be chosen to give a new q.

EXAMPLE 4

A fourth way to specify some of the bits of an m-bit modulus n, involves specifying the last t bits for some t<512. Let α be a known t-bit number. If we then let p and q be primes of size approximately m/2 bits with $p \cdot q \equiv \alpha \pmod{2^t}$ then the last t bits of n will be exactly α.

To generate these primes first choose any random m/2-bit prime p. Using the Extended Euclidean Algorithm c can then be obtained such that $p \cdot c \equiv \alpha \pmod{2^t}$. If we then choose a random (512-t)-bit number b such that $q = 2^t \cdot b + c$ is prime, it is easy to see that $p \cdot q \equiv \alpha \pmod{2^t}$ and n is the desired modulus.

As mentioned above the distribution of primes in any congruence class is about the same as for any interval of about the same size. Thus for a 1024 bit modulus one would expect there to be about $2^{512-t}/\ln(2^{512})$ primes in the congruence class searched. It seems reasonable then that if t is chosen to be somewhere between 492 and 482 one would expect to find a prime, q, of the desired form without much difficulty. If this fails a new p can then be picked and the calculations repeated.

The maximum number of bits that can be specified may be determined by considering the question of how many bits of the modulus can be specified so that p and q can be found in time proportional to a polynomial in log(n). To do this it is useful to look at the problem in its most general form and introduce a technique for factoring β where $f_1$ and $f_2$ are not specified ahead of time. This new technique does not add anything to any of the other techniques discussed above. It is simply a generalization of the different schemes presented and is included as another way of looking at the problem.

The modulus is, as usual, n=p·q where p and q are of the form $p = 2^c \cdot f_1 + a_1$ and $q = 2^c \cdot f_1 + a_2$. Here $a_1$ and $a_2$ are l-bit numbers while $f_1$ and $f_2$ are each k bits. Again it is possible to specify α and β which are c and t-bit numbers, respectively, ahead of time to be public. Now $f_1$ and $f_2$ are such that $f_1 \cdot f_2 = 2^u \cdot \beta + \delta$ where δ is a u-bit number. $f_1$ and $f_2$ can be determined by varying δ and trying to factor $2^u \cdot \beta + \delta$ appropriately. This should be a relatively simple task as long as u is sufficiently large.

Now $$n = p \cdot q$$
$$= 2^{2 \cdot c} \cdot f_1 \cdot f_2 + 2^c \cdot (f_1 \cdot a_2 + f_2 \cdot a_1) + a_1 \cdot a_2$$
$$= 2^{2 \cdot c}(\beta \cdot 2^u + \delta) + 2^c(f_1 \cdot a_2 + f_2 \cdot a_1) + a_1 \cdot a_2.$$

In order that β appear as the first t bits we will need the following constraints.

If m is the total number of bits in n then:
1. $2 \cdot c + 2 \cdot k = m$.
2. $c+k+l<m-t$ to avoid rippling into the high order t bits.
3. $2 \cdot l > c+s$ to ensure at least s bits of rippling into the middle term.
4. $c+l+k>2 \cdot c+s$ to ensure at least s bits of rippling into the first term.

Simplifying 1, 2, 3 & 4 results in:
2. $l+t<m/2$.
3. $2 \cdot l - c > s$.
4. $l - 2 \cdot c > s - m/2$.

The maximum number of bits that can be specified using this scheme is determined by maximizing the size of α and β, or equivalently, t+c. This is obtained from the solution of the following integer linear program. It is assumed that m and s are given and fixed.)

Maximize B=t+c

Subject to: $l+t<m/2$
  $c - 2 \cdot l < -s$
  $2 \cdot c - l < m/2 - s$ and all variables are non-negative.

As simply a linear program the optimal value is given by $t=(m-s)/3$, $l=(m+2 \cdot s)/6$, $c=(m-s)/3$ and $B=t+c=2(m-s)/3$. Solving this program for m=1024 and s=64, yields t=320, c=320, l=192, and k=242 indicating that it is possible to specify 640 bits of a 1024-bit modulus.

To determine how many bits of p or q are revealed by this method, suppose for any choice of δ,$f_1$ and $f_2$ both have a fixed number χ of high order bits. Consider that greater than one in two numbers with $2 \cdot k$ (the number of bits in $f_1 \cdot f_2$) bits factors appropriately. We have only $2^{2 \cdot (k-x)}$ numbers.

The only problem with specifying this many bits is in generating the primes. Notice that α is c=320 bits long and both $a_1$ and $a_2$ are l=192 bits long. Thus for every $a_1$ that is chosen to make p prime, after applying the Extended Euclidean Algorithm to find $a_2$, we may get an $a_2$ of 320 bits.

This choice for $a_2$ will obviously not work satisfactorily, as many different values of $a_1$ must then be tried until we get an $a_2$ that fits, and then chances are that it will not produce a q that is prime. To overcome this problem it is necessary to add the constraint $c \leq l$ to our integer linear program. Solution of the revised integer linear program yields t=446, c=65, l=65 and β=511. Hence this scheme offers no advantage over previously described schemes that can specify 512 bits.

The practicality of implementing the above techniques is determined in part by the running times of the algorithms used to produce p and q for all three schemes described.

In the embodiment of FIG. 2a when only the first t bits are being specified for m/2-bit primes p and q, the choice of p and q are independent and Maurer's fast prime generation technique is used. It is known that the running time for this generation of primes is $O(m^3 \ln(\ln(m)))$ bit operations.

In the other schemes described for m/2 bit primes p and q the choice of p and q are not independent and hence the running time is slightly worse. Initially p is produced using Maurer's fast prime generation technique which has running time $O(m^3 \ln(\ln(m)))$ bit operations. q is then produced and tested for primality, which must be done approximately $\ln(2^m)$ times before a prime q is found. Thus the running time of producing appropriate primes p and q is $O(m^3 \ln(\ln(m))\ln(2^m))$ or $O(m^4 \ln(\ln(m)))$ bit operations.

The results of implementation of the examples set out above on a SUN-2 SPARC-station using MAPLE V are as follows. A naive prime generating algorithm was used in which an odd random number of the appropriate size was chosen and then increased by 2 until it passed the Miller-Rabin primality test with 5 iterations. The times shown are average times over a number of different trials. All primes produced are 512-bit numbers.

The average time to produce one prime for a modulus in which the first 296 bits are specified is 205.9 sec.

The average time to produce both primes when half the bits of the modulus are specified is 36866.1 sec.

The average time to produce both primes when the first 256 bits and the last 218 bits of the modulus are specified is 437.7 sec.

The average time to produce both primes when the last 487 bits of the modulus are specified is 710.6 sec.

Notice that for all the three schemes in which the choice of q is not totally dependent on p, the time to generate both primes is about the same. When half the bits are specified, and the choice of q is totally dependent on p, the time increases dramatically.

These results indicate that the schemes described above are feasible.

To compare the security of using the specially constructed primes with that of using general primes p and q it is necessary to consider the difficulty of factoring $$n = 2^{k1+k2} \cdot f_1 \cdot f_2 + 2^{k2} \cdot f_2 \cdot a_1 + 2^{k1} \cdot f_1 \cdot a_2 + a_1 \cdot a_2$$

where $f_1$ and $f_2$ are k-bit numbers, $a_1$ and $a_2$ are $l_1$ and $l_2$ bits respectively and everything is known except for $a_1$ and $a_2$. It is also known that n factors as $p \cdot q = (2^{k1} \cdot f_1 + a_1)(2^{k2} \cdot f_2 + a_2)$.

To make n resistant to a Pollard-(p−1) attack, (p−1) and (q−1) should each have at least one prime factor of about 15 digits. The probability that a 512-bit number will have all of it's prime factors less than about 15 digits is about $3 \times 10^{-11}$. Thus, for all practical purposes, n is resistant to this type of attack. A practical question that arises is how can one feasibly ensure that both (p−1) and (q−1) are devisable by a large prime, particularly in situations where the prime q is tightly constrained by the choice of p?

When specifying the last t bits of a 1024-bit modulus n, this problem can be satisfied as follows. It is necessary for $p \cdot q \equiv \alpha \pmod{2^t}$. Assume p has been constructed with a large prime factor. Then let Q be some other large prime (e.g. greater than 15 digits). A q can be produced of the form q=QR+1 for some positive integer R. The congruence $p(QR+1) \equiv \alpha \pmod{2^t}$ can be solved for R. We can then search this equivalence class can then be searched for R's that will give a prime q.

A further attack is the number field sieve which factors numbers of the special form $n=r^e \pm s$ for small integers r and s. However, this does not apply to the above methods as the product produced here has no higher probability of being of this special form than a general product of primes.

The quadratic sieve algorithm is the most efficient general purpose factoring algorithm known. It cannot, however, factor numbers of 1024 bits so this attack also appears to be resisted. The elliptic curve factorization method only works on integers with "small" prime factors and so does not apply here.

Can the special structure of the product be exploited to factor n? All that is required is to determine $a_1$ and $a_2$. $a_1 \cdot a_2 (\bmod \min(2^{k1}, 2^{k2}))$ is known, but little else as the other products are added together. Thus if $l_1+l_2 > \min(k_1, k_2)$, in particular if $2^{l1+l2-\min(k1,k2)}$ is of the order of $e^{\sqrt{\ln(n)\ln(\ln(n))}}$ (the quadratic sieve running time) no advantage will be gained in trying brute force over the general factoring algorithms.

There are two possible attacks that will work but do not seem to be feasible. The first attack is as follows. We have n=pq where n is 6 k bits and p is 3 k bits. We can now search a k bit range for p. Let p' be a guess at p fixed in the centre of the k bit range. Now calculate n/p' including k fraction bits. The fraction n/(p'+d) can be expanded in a power series as $n/p' - dn/p'^2 n/p'^3 - \ldots$ . If this is an integer then it is a q. Since $|d|<2^k$ the term $d^2 n/p'^3$ is $O(2^{-k})$, so we can ignore it. If we calculate 2 k fraction bits of $n/p'^2$ we can use an Extended Euclidean Algorithm to calculate possible d's by equating the fractional part of n/p' to that of $d(n/p'^2)$. The calculation is about the same work as expanding 2 k bits of the fractional part of $n/p^2$ as a continued fraction.

In the above schemes n is 1024 bits and p is 512 bits. It can be assumed the opponent know all but the low 240 bits of p (all of the schemes can be modified so that this is the case). Assume that she guesses the next 70 bits, leaving the low 170 bits to be determined. Then this attack will take $2^{70}$ calculations of the above type. This does not appear to be feasible.

For the second attack notice that the product is of the form $n=(2^{384} f_1 + a_1)(2^{384} f_2 + a_2)$ where $f_1$ and $f_2$ are 128 bits and $a_1$ and $a_2$ are at least 240 bits. It is public knowledge that $f_1 f_2 = \beta$. Now, $f_1 f_2 n = (2^{384} f_1 f_2 + a_1 f_2)(2^{384} f_1 f_2 + a_2 f_1)$ has two nearly equal factors. One can now attempt to factor this product as a difference of squares by writing $z^2 = y^2 - f_1 f_2 n$ and scanning through possible y's starting at $\sqrt{f_1 f_2 n}$ until a perfect square is found. This search will take about $z^2/2y$ trials to factor n. Since $$z = \left| \frac{f_1 a_2 - f_2 a_1}{2} \right|$$

is about 368 bits, and y is 640 bits, the scan will take about $2^{95}$ trials, which does not appear to be feasible.

Recently, Kaliski broke Anderson's RSA trapdoor. The proposed trapdoor is based on a secret value A which is 200 bits long and is used to produce 256-bit primes p of the form p=r(q,A)A+q. Here q is a prime less than $\sqrt{A}$, and r is 56 bits long and a function of A and q. Kaliski uses some "unusually good simultaneous Diophantine approximations" and lattice basis reduction to break the trapdoor. The approximations rely on the fact that $q < \sqrt{a}$ however. The above schemes can be compared to this with $r = f_1$, $A = 2^{384}$ and $q = a_1$. Since we do not have $a_1 < 2^{192}$, this technique cannot be used.

Both Maurer and Rivest and Shamir described schemes for factoring n with an oracle. Maurer's technique does not seem to apply here as his oracle answers questions regarding the order of elliptic curves modulo p. Rivest and Shamir however describe a method for factoring n if the high order m/3 bits of p are known. In the above schemes, this number of bits of either factor is never revealed so this does not seem to apply here. It is not seen how to generalize their attack and apply it to the moduli above.

It would appear that this specially constructed n is no easier to factor than a general product of two primes and therefore will not compromise security.

Accordingly, various methods for constructing moduli that are the product of two primes and which have a fixed number of bits predetermined have been described permitting the generation of public keys with bits of a predetermined configuration. These configurations do not appear to jeopardize the integrity of the encryption system and their generation is feasible within practical constraints.

It will be appreciated that the specified bits may be used to be representative of publically available information of one of the parties, such as the identity of the party, the binary representation of a parties name or the entity or group to which a party belongs. The ability to specify a predetermined configuration of bits permits other information that has to be transmitted to be contained within the modulus to reduce the overall frame length. Alternatively the modulus transmitted can be reduced and the predetermined configuration added at the sender and/or recipient as appropriate.

What is claimed is:

1. A method of providing an m bit modulus n for use in generating a key for use in a public key encryption scheme implemented between a pair of parties communicating with one another over a data communication system, said modulus n having a set of 2 k bits of predetermined pattern $\beta$ correlated to information to be exchanged between the parties and of length less than modulus n, said method comprising the steps of:

a) determining the factors $f_1$ and $f_2$ of $\beta$;

b) selecting a first prime p of form $2^{m-k} \cdot f_1 + a_1$ where $a_1$ is an l bit number;

c) selecting a second prime q of form $2^{m-k} \cdot f_2 + a_2$ where $a_2$ is an l bit number;

d) thereafter determining that $l + 2 \cdot k < m/2 - 2$;

e) computing the modus n for use in a public key encryption scheme by multiplying p and q whereby the first 2 k bits of the modulus n are the predetermined pattern $\beta$; and f) utilizing said modulus n in a key for use in encrypting the message with the key and for use in transferring the encrypted message from one of the parties over said data communication system.

2. Method of claim 1 wherein a second set of u bits of predetermined configuration $\alpha$ is provided in said modulus n by selecting $a_1$ and $a_2$ such that the product $a_1 \cdot a_2 = \alpha (\bmod 2^u)$.

3. A method according to claim 1 wherein said factors $f_1$ and $f_2$ are each of length k bits.

4. A method according to claim 2 wherein said second set of u bits is of length k bits.

5. A method according to claim 3 wherein said second set of u bits is of length k bits.

6. A method according to claim 1 wherein said predetermined configuration is representative of public information pertaining to one of said parties.

7. A method of providing an m bit modulus n for use in a public key encryption scheme between a pair of parties communicating with one another over a data communication system, said modulus n having a set of t bits of a predetermined pattern $\alpha$ representative of information exchanged between the parties and of length less than said modulus n, said method comprising the steps of i) selecting a pair of primes p and q with each of said primes having in the order of m/2 bits;

ii) determining that the product p·q of said primes corresponds to $\alpha (\bmod 2^t)$ and selecting the product p·q as the modulus n whereby the last t bits of said modulus n corresponds to $\alpha$; and iii) utilizing said modulus n in a key for use in encrypting the message with the key and for use in transferring the encrypted message from one of the parties over said data communication system.

* * * * *

UNITED STATES PATENT AND TRADEMARK OFFICE
CERTIFICATE OF CORRECTION

PATENT NO.        : 6,377,689 B1                                    Page 1 of 1
APPLICATION NO. : 09/612685
DATED             : April 23, 2002
INVENTOR(S)      : Scott A. Vanstone and Robert J. Zuccherato It is certified that error appears in the above-identified patent and that said Letters Patent is hereby corrected as shown below:

The name of the first named inventor is changed from "Scott C. Vanstone" to -- Scott A. Vanstone --

The name of the assignee is changed from "Certigom Corp." to -- Certicom Corp. --

Signed and Sealed this

Sixth Day of April, 2010

David J. Kappos
*Director of the United States Patent and Trademark Office*